United States Patent
Huang et al.

(10) Patent No.: US 11,618,519 B2
(45) Date of Patent: Apr. 4, 2023

(54) METHOD OF TRACKING CONTROL FOR FOOT FORCE AND MOMENT OF BIPED ROBOT

(71) Applicant: BEIJING INSTITUTE OF TECHNOLOGY, Beijing (CN)

(72) Inventors: Qiang Huang, Beijing (CN); Zhangguo Yu, Beijing (CN); Xuechao Chen, Beijing (CN); Chencheng Dong, Beijing (CN); Qingqing Li, Beijing (CN); Libo Meng, Beijing (CN); Gao Huang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 282 days.

(21) Appl. No.: 16/885,527

(22) Filed: May 28, 2020

(65) Prior Publication Data

US 2021/0009218 A1    Jan. 14, 2021

(30) Foreign Application Priority Data

Jul. 11, 2019  (CN) .......................... 201910622271.3

(51) Int. Cl.
*B62D 57/02* (2006.01)
*B25J 9/16* (2006.01)
*B25J 13/08* (2006.01)
*G05D 15/01* (2006.01)

(52) U.S. Cl.
CPC ............ *B62D 57/02* (2013.01); *B25J 9/1628* (2013.01); *B25J 13/085* (2013.01); *G05D 15/01* (2013.01)

(58) Field of Classification Search
None
See application file for complete search history.

(56) References Cited

U.S. PATENT DOCUMENTS

| 2011/0160906 A1* | 6/2011 | Orita ................... B62D 57/032 901/1 |
| 2018/0250812 A1* | 9/2018 | Narukawa ............. B25J 19/063 |
| 2020/0209890 A1* | 7/2020 | Xiong .................. B62D 57/032 |

FOREIGN PATENT DOCUMENTS

JP          2004130460 A   *   4/2004

* cited by examiner

*Primary Examiner* — Jeff A Burke
*Assistant Examiner* — Jerrod Irvin Davis
(74) *Attorney, Agent, or Firm* — Wenderoth, Lind & Ponack, L.L.P.

(57) ABSTRACT

The present invention discloses a method of tracking control for a foot force and moment of a biped robot. According to the method, a double-spring damping model is designed, and a force tracking controller is designed by using an LQR optimization method, so as to realize tracking of the foot force and moment of the biped robot. Further, a desired force on a foot and a desired moment on the foot are calculated through a planned ZMP distribution method, thereby eventually achieving better ZMP tracking of the biped robot and adapting to ground of certain unevenness. According to the present invention, the traditional control method of ZMP tracking to realize stable walking of a biped robot and adapting to uneven ground is abandoned; instead, a desired force and moment on a foot enabling stable walking of the robot are directly calculated, and direct control is performed to realize tracking of the force and moment on the foot, so as to carry out stable control in a more essential and easy-to-implement manner, thereby achieving faster control response, stronger capability of adapting to uneven ground, and ideal ZMP tracking effect.

11 Claims, 6 Drawing Sheets

(a)

(b)

METHOD OF TRACKING CONTROL FOR FOOT FORCE AND MOMENT OF BIPED ROBOT

TECHNICAL FIELD

The present invention relates to the field of robot technologies, and specifically to a method of tracking control for a foot force and moment of a biped robot.

BACKGROUND

Zero moment point (ZMP) is a very important concept in the research of biped robots and is essential to walking planning, stability and so on of biped robots. An important means of evaluating whether a biped robot walks stably is whether an actual ZMP can well track a planned ZMP. Moreover, the force and moment on the foot can reflect the ZMP situation of the robot, and the actual ZMP of the robot walking on flat ground is generally calculated through the force and moment on the foot, so that the actual force and moment on the foot of the robot can be controlled to track the planned force and moment so as to realize ZMP tracking and more stable walking of the robot.

From a physical perspective, such a method enables the foot to keep providing the force and moment required for stable walking of the robot and thus can theoretically achieve the effect of allowing the robot to walk on any uneven ground. However, due to the lag caused by the robot system and various errors caused by the impact, the control effect of the force and moment cannot reach the theoretical ideal state, and the robot can only adapt to ground with small unevenness, which is nevertheless valuable for position control robots.

The prior art discloses a stability control method for a biped robot walking on uneven ground. The method uses compliance control and can reduce impact when the foot of the robot meets ground to ensure that the ZMP is within the support area of the sole when the foot is landed, thereby meeting stable walking conditions of the robot. However, the method does not consider that the ZMP can track a planned value as much as possible, let alone considering the tracking of the foot force and moment. Just control of the ZMP within the support area cannot solve the stability problem of the robot walking on uneven ground. The prior art discloses a ZMP tracking method based on whole body momentum compensation. The method can compensate a ZMP difference by using momentum generated by rotation of joints throughout the body, but does not consider the situation of the robot walking on uneven ground or consider the force on the foot of the robot, and cannot deal with the problem of ZMP tracking on uneven ground.

The prior art further provides a method for calculating a planned force and moment of a robot using a planned ZMP. The method does not focus on making the foot force and moment track the planned value to achieve the purpose of walking on uneven ground, and thus only uses a very simple admittance controller for control to achieve the adjustment effect. However, the controller has an excessively small adjustment range, which cannot meet control requirements for uneven ground with slight protrusions and depressions.

To sum up, the prior art mostly directly detects an actual ZMP of a robot and controls the actual ZMP to track a planned ZMP to realize stable walking of the robot. However, implementation by using ZMP tracking has two drawbacks: first, calculation of a ZMP on uneven ground is theoretically inconvenient and inaccurate, and thus cannot desirably reflect the walking state of a robot. That is, using the control method of ZMP tracking alone on uneven ground definitely has undesirable effect, and the calculated ZMP of the robot cannot always be required to track the planned value. Second, due to the impact and error of a force sensor, the ZMP calculated from the foot force and moment is also inaccurate. Added with the theoretical error, the real ZMP of the robot calculated in this way is not real at all, which definitely affects the control effect.

SUMMARY

In order to solve the problems existing in the prior art, the present invention discloses a method of tracking control for a foot force and moment of a biped robot, which can not only realize desirable tracking of an actual ZMP on a planned ZMP on flat ground for the biped robot, but also desirably realize stable walking on ground with small unevenness. Besides, the design of a control model of a force tracking controller can reduce the impact on the foot when it meets ground.

The present invention achieves the aforementioned technical objective through the following technical solution.

A method of tracking control for a foot force and moment of a biped robot is as follows: a desired force on a foot and a desired moment on the foot of the robot are distributed through a planned zero moment point of the robot, differences of the desired force on the foot and the desired moment on the foot from an actual force on the foot and an actual moment on the foot are respectively calculated, and the differences are used as input of a force tracking controller, the force tracking controller outputs position adjustment quantities in three directions of an ankle joint, and the position adjustment quantities are added to original ankle joint trajectory planning to obtain an adjusted ankle joint trajectory, and joint angles are obtained through inverse kinematics, so as to realize tracking of the foot force and moment of the robot and then realize ZMP tracking.

Further, the three directions of the ankle joint comprise a vertical direction, a pitch direction, and a roll direction of the ankle joint.

Further, the actual force on the foot and the actual moment on the foot are calculated through a six-dimensional force sensor in an ankle of the robot.

Further, the desired force on the foot and the desired moment on the foot are calculated through a planned ZMP distribution method.

Furthermore, the specific process of calculation through the planned ZMP distribution method is:

(1) calculating desired forces and moments on feet in a single-foot support period calculating and distributing desired forces on feet in vertical directions of a left foot and a right foot according to a ratio of distances between the ZMP and ankle joints of two feet, and then respectively cross-multiplying vectors from the ZMP to positions of the ankle joints of the two feet by the two desired forces to respectively obtain desired moments on feet of the two feet; and (2) calculating desired forces and moments on feet in a double-foot support period wherein a calculation method for the desired forces on feet is the same as that in the single-foot support period, and in calculating the desired moments on feet, first, a sum of desired moments of the two feet is calculated using the method for calculating desired moments on feet in the single-foot support period, and then desired moments on feet of the left foot and the right foot are calculated and distributed according to the ratio of the distances between the ZMP and the ankle joints of the two feet.

Further, an expression of the force tracking controller is: e=dsd(F, $F_{old}$, $e_{old}$, $\dot{e}_{old}$, $T_{CONTROL}$), where e is a sum of deformation quantities of two spring damping systems, F is an input external force, $F_{old}$ is an input force of a previous control period, $e_{old}$ is an output position adjustment quantity of the previous control period, $\dot{e}_{old}$ is an output position adjustment quantity derivative of the previous control period, and $T_{CONTROL}$ is a control period.

Further, the two spring damping systems are connected in series to form a double-spring damping model, and each spring damping system is formed by a spring and a damper connected in parallel.

The beneficial effects of the present invention are as follows:
(1) In the present invention, planned values of forces and moments on feet of a robot are calculated through a planned ZMP value.
(2) In the present invention, admittance control is used to output position adjustment quantities from force errors, and other control means needs to be employed to reduce the influence of the lag produced by admittance control operating on a robot system.
(3) In the present invention, a double-spring damping model is used to design an admittance controller, which has an impact-absorbing and compliance effect and can achieve a desirable force and moment tracking effect.
(4) The present invention improves the method for distributing and calculating a planned foot force and moment of a robot through a ZMP, and can reflect more truly the force and moment that should be theoretically provided by the foot of the robot.
(5) The present invention embodies ZMP tracking in tracking of the foot force and moment, tries to solve a more fundamental problem in considering the problem of stable walking of the robot, can adapt to ground with larger unevenness, and achieves an ideal actual ZMP tracking effect.

BRIEF DESCRIPTION OF THE DRAWINGS

FIG. 6A is a curve diagram illustrating a tracking situation of a force on a left foot, and FIG. 6B is a curve diagram illustrating a tracking situation of a force on a right foot.

DETAILED DESCRIPTION OF THE EMBODIMENTS

In order to enable those skilled in the art to better understand the solutions of the present invention, the technical solutions in the embodiments of the present invention will be clearly and fully described below with reference to the accompanying drawings in the embodiments of the present invention. It is obvious that the embodiments to be described are only a part rather than all of the embodiments of the present invention. All other embodiments derived by those of ordinary skill in the art based on the embodiments of the present invention without carrying out creative efforts should fall within the protection scope of the present invention.

Figure 1:
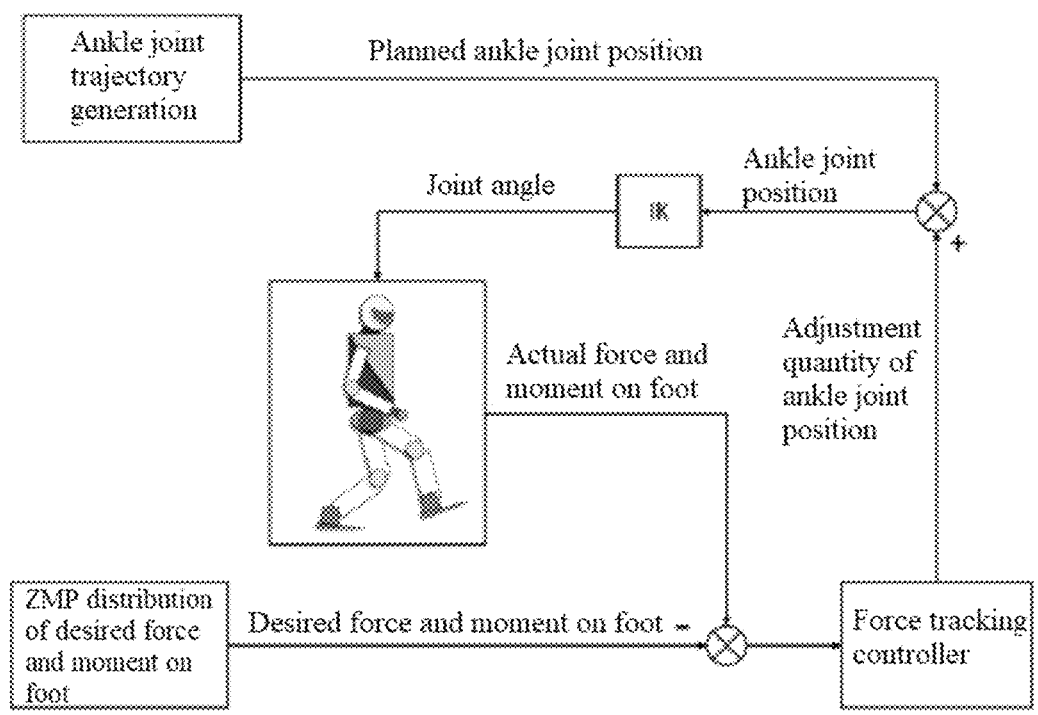
FIG. 1 is a flowchart of tracking control for a foot force and moment of a biped robot in the present invention.

FIG. 1 shows a method of tracking control for a foot force and moment of a biped robot. A desired force on a foot and a desired moment on the foot of the robot are distributed through a planned zero moment point (ZMP) of the robot, differences of the desired force on the foot and the desired moment on the foot from an actual force on the foot and an actual moment on the foot are respectively calculated, and the differences are used as input of a force tracking controller, the force tracking controller outputs position adjustment quantities in three directions of an ankle joint (which are respectively a vertical direction, a pitch direction Pitch, and a roll direction Roll of the ankle joint), and the position adjustment quantities of the ankle joint are added to original ankle joint trajectory planning to obtain an adjusted ankle joint trajectory, and joint angles are obtained through inverse kinematics (IK), so as to realize tracking of the foot force and moment of the robot and then realize ZMP tracking.

Figure 2:
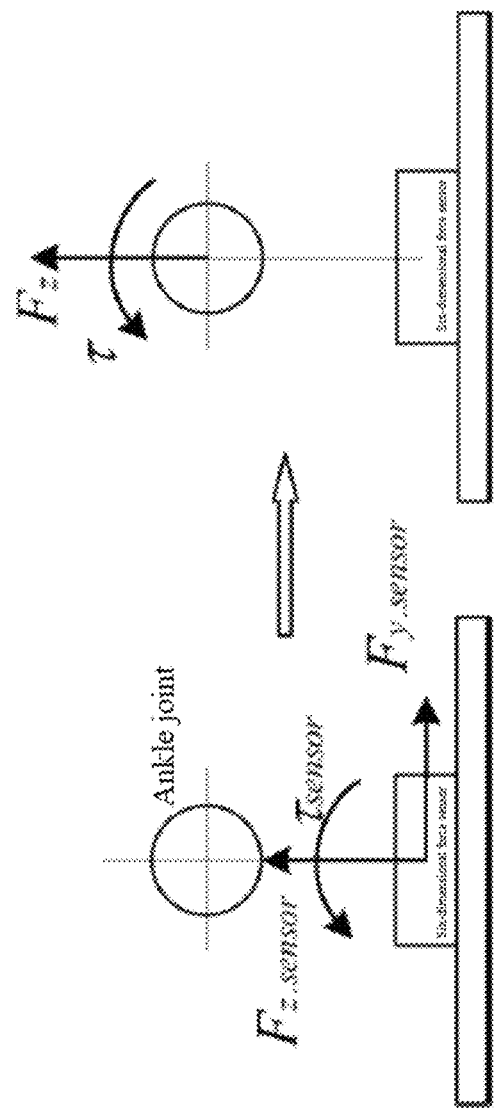
FIG. 2 is a schematic diagram of a process that a six-dimensional force sensor calculates an actual force on a foot.

The actual force on the foot and the actual moment on the foot are measured and calculated through a six-dimensional force sensor in an ankle of the robot. The specific calculation process is as follows:

As shown in FIG. 2, $F_{z.sensor}$ is a force in a z direction in a foot coordinate system that is measured by the force sensor, $F_{y.sensor}$ is a force in a y direction in the foot coordinate system that is measured by the force sensor, and $\tau_{sensor}$ is a moment in an x direction in the foot coordinate system that is measured by the force sensor. An actual force and moment of the robot in a waist coordinate system need to be calculated according to the force and moment measured by the force sensor.

Figure 3:
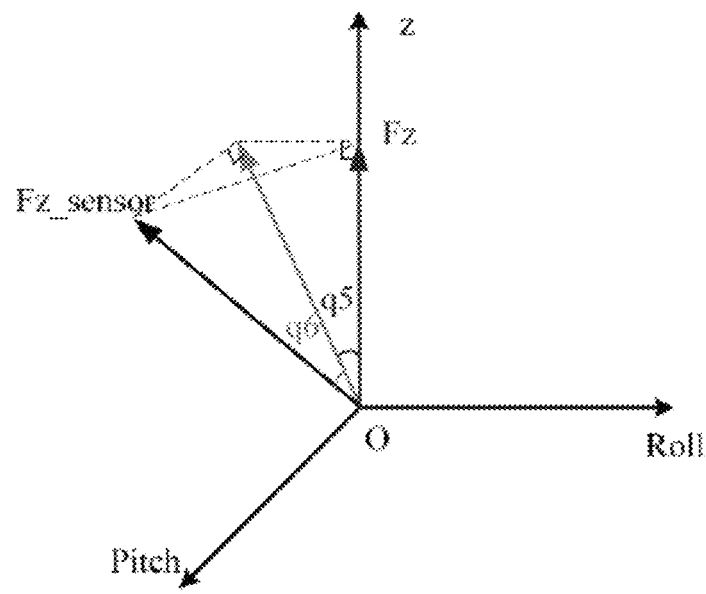
FIG. 3 is a schematic diagram illustrating mapping of a force, in a z direction, on a foot of the biped robot in the present invention.

When the foot of the robot rotates, the posture of the foot coordinate system is no longer the same as that of the waist coordinate system. As a result, $F_{z.sensor}$ measured by the force sensor is different from $F_z$ used in the control method of the present invention, and $F_{z.sensor}$ needs to be first mapped to the waist coordinate system to obtain $F_z$. As shown in FIG. 3, the coordinate system O is the waist coordinate system of the robot and is an effective coordinate system relative to the robot itself. According to the order of degrees of freedom of the robot leg, the foot first rotates in the Pitch direction and then rotates in the Roll direction, and the rotation angles thereof are respectively q5 and q6. Next, $F_{z.sensor}$ is projected to the z axis of the coordinate system O to calculate the actual force $F_z$:

$$F_z = F_{z.senor} \cdot \cos q_6 \cdot \cos q_5 \quad (1)$$

Then, the moment is calculated. Using calculation of the moment in the x direction as an example, the actual moment $\tau$ is calculated using the following equation:

$$\tau = F_{y.sensor} \cdot H_{Ankle} + \tau_{sensor} \quad (2)$$

where $H_{Ankle}$ is a height difference between a geometric center of the sensor and an axis center of the ankle joint.

Figure 4:
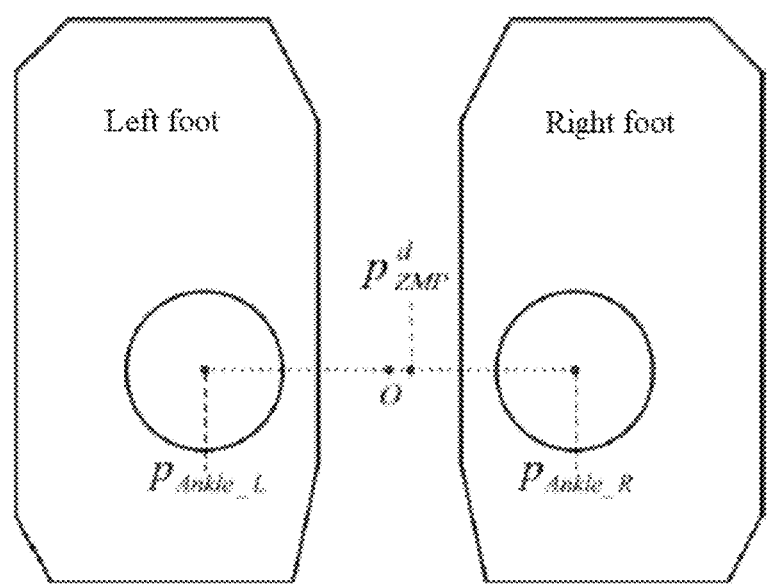
FIG. 4 is a schematic diagram illustrating planning of ankle joint positions of two feet and a ZMP position of the robot in a world coordinate system.

The desired force on the foot and the desired moment on the foot of the robot are calculated using a planned ZMP distribution method. First, a desired force on the foot and a desired moment on the foot, namely, a desired force and moment applied by the foot of the robot to the ground, are calculated, and the desired force and the desired moment on the foot are the opposite of the desired force and moment applied by the foot to the ground. As shown in FIG. 4, equations of desired forces and moments in a single-foot support period are as follows:

$$\begin{cases} f_L^d = -\alpha Mg \\ f_R^d = -(1-\alpha)Mg \\ \tau_L^d = (p_{Ankle\_L} - p_{ZMP}^d) \times f_L^d \\ \tau_R^d = (p_{Ankle\_R} - p_{ZMP}^d) \times f_R^d \end{cases} \quad (3)$$

where $f_L^d$ and $\tau_L^d$ are the desired force and moment of the left foot, JR and $\tau_R^d$ are the desired force and moment of the right foot, Mg is the gravity of the whole body of the robot, $p_{Ankle\_L}$ and $p_{Ankle\_R}$ are respectively desired positions of ankle joints of left and right feet of the robot in the world coordinate system, and $p_{ZMP}^d$ is a desired position of the ZMP of the robot in the world coordinate system. A midpoint of a line segment connected between two ankles of the robot in a reset state is usually used as a zero point (point O in FIG. 4) of the coordinate system. Besides, a calculation method for the scale factor $\alpha$ is as follows:

$$\alpha = \frac{p_{Ankle\_R} - p_{ZMP}^d}{p_{Ankle\_R} - p_{Ankle\_L}} \quad (4)$$

where $p_{Edge\_L}$ and $p_{Edge\_R}$ are inner edges of the left and right feet of the robot.

It can be seen from equation (4) that when $p_{ZMP}^d$ greater than $p_{Ankle\_R}$, $\alpha$ turns negative, and the desired force on the left foot has an upward direction, which is illogical; when $p_{ZMP}^d$ is less than $p_{Ankle\_L}$, $(1-\alpha)$ turns negative, and the desired force on the right foot has an upward direction, which is also illogical. Accordingly, the range of a needs to be limited. The practical meaning is that when the planned ZMP of the robot moves to a place right below or outside the ankle joint of any foot, it is considered that the foot supports the weight of the whole robot. The judgment method is as follows:

if $\alpha > 1$ then $\alpha = 1$ if $\alpha < 0$ then $\alpha = 0$ \quad (5)

Therefore, in the single-foot support period and when the ZMP is within the support area of any foot, the desired force and moment can be calculated using the aforementioned method, but at other time of a double-foot support period, the distribution of moments of two feet needs to be considered. Since a summed moment of the forces and moments on the left and right feet of the robot is zero at the point ZMP, the calculation equation for the summed moment $\tau$ of the left and right feet is as follows:

$$\tau = -(p_{Ankle\_L} - p_{ZMP}^d) \times f_L^d - (p_{Ankle\_R} - p_{ZMP}^d) \times f_R^d \quad (6)$$

The foot moment distribution in the double-foot support period is as follows:

$$\begin{cases} \tau_L^d = \alpha \tau \\ \tau_R^d = (1-\alpha)\tau \end{cases} \quad (7)$$

The calculated desired moment is distributed in two directions of x (roll direction) and y (pitch direction), so as to calculate the respective desired moments of the left and right feet.

Figure 5:
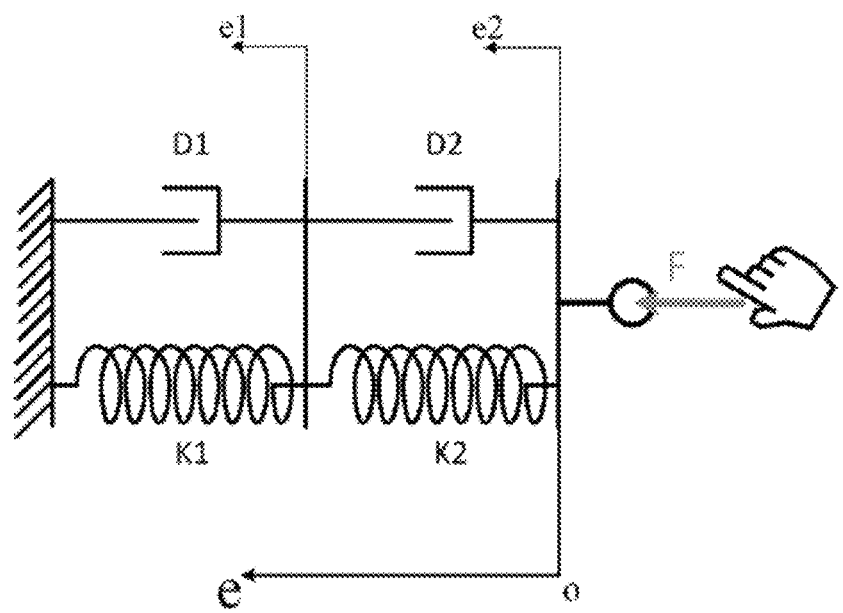
FIG. 5 is a schematic diagram of a double-spring damping model in the present invention.

The design method of the force tracking controller is as follows:

As shown in FIG. 5, a constructed double-spring damping model is formed by two spring damping systems connected in series, and each spring damping system is formed by a spring and a damper connected in parallel. The spring 1 has a deformation quantity of e1, an elastic coefficient of K1, and a damping coefficient of D1, and the spring 2 has a deformation quantity of e2, an elastic coefficient of K2, and a damping coefficient of D2. Assuming that e1 and e2 of the springs in original length and the sum e of deformation quantities of the two spring damping system are all zero, e=e1+e2, and F is an input external force, the two springs respectively satisfy the following equations:

$$\begin{cases} F_1 = K_1 e_1 + D_1 \dot{e}_1 \\ F_2 = K_2 e_2 + D_2 \dot{e}_2 \end{cases} \quad (8)$$

Laplace transform is performed on the two equations:

$$\begin{cases} F_1(s) = (K_1 + D_1 s) e_1(s) \\ F_2(s) = (K_2 + D_2 s) e_2(s) \end{cases} \quad (9)$$

Laplace transform is performed on the sum of the deformation quantities of the springs to obtain:

$$e(s) = e_1(s) + e_2(s) \quad (10)$$

Equation (9) is substituted into equation (10) to obtain:

$$e(s) = \frac{K_1 + K_2 + (D_1 + D_2)s}{K_1 K_2 + (K_1 D_2 + K_2 D_1)s + D_1 D_2 s^2} F(s) \quad (11)$$

Inverse Laplace transform is performed to obtain the relationship between e and F:

$$K_1 K_2 e + (K_1 D_2 + K_2 D_1)\dot{e} + D_1 D_2 \ddot{e} = (K_1 + K_2)F + (D_1 + D_2)\dot{F} \quad (12)$$

The above equation is linearly discretized to obtain the expression of the force tracking controller as follows:

$$e = dsd(F, F_{old}, e_{old}, \dot{e}_{old}, T_{CONTROL}) \quad (13)$$

where $F_{old}$ is an input force of a previous control period, $e_{old}$ is an output position adjustment quantity of the previous control period, $\dot{e}_{old}$ is an output position adjustment quantity derivative of the previous control period, and $T_{CONTROL}$ is a control period.

Coefficients of the force tracking controller are optimized using LQR, after desirable controller coefficients are obtained, an ideal force and moment tracking effect can be achieved, and since the double-spring damping model is used, the foot has a certain compliance effect in actual application. In setting elastic coefficients and damping coefficients of the two springs, they are configured as combinations of large stiffness—medium damping and small stiffness—large damping. The specific data is shown in Table 1:

TABLE 1

| Elastic coefficients and damping coefficients of two springs | |
|---|---|
| K1 | 10000 |
| D1 | 5700 |
| K2 | 2000000 |
| D2 | 2000 |

Figure 6:
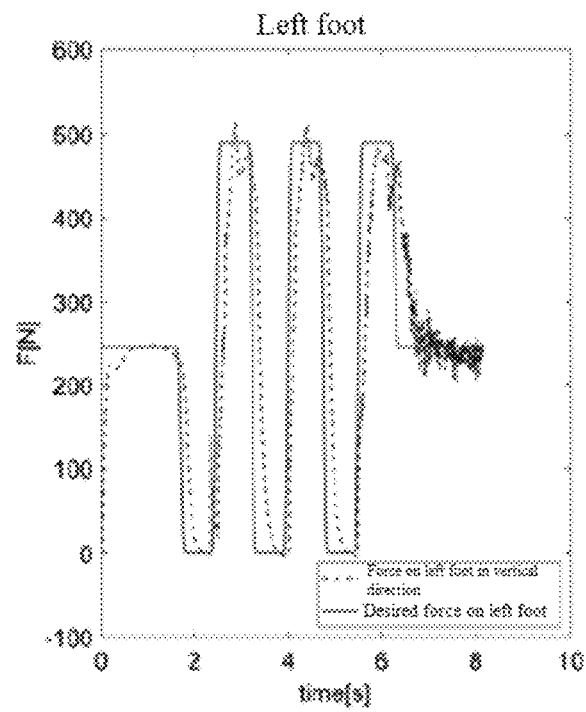
FIG. 6A and FIG. 6B are curve diagrams illustrating experimental data of a tracking effect of a foot force, where
Figure 6:
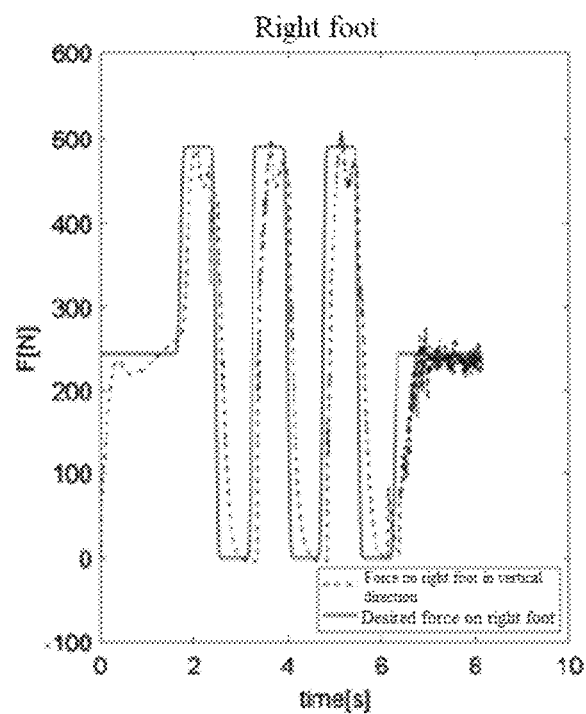

In this way, the foot can have an impact-absorbing effect and produce a desirable force and moment tracking effect. FIG. 6A is a curve diagram illustrating the tracking situation of the force on the left foot, and FIG. 6B is a curve diagram illustrating the tracking situation of the force on the right foot. It can be seen from the figures that the actual force can desirably track the desired force. In spite of shaking due to excessive impact and small lag due to system inertia, the overall tracking effect meets control requirements.

The above description is merely preferred embodiments of the present invention, and is not intended to limit the present invention in any form. Although the present invention has been disclosed above through the preferred embodiments, they are not intended to limit the present invention. Those skilled in the art can make many possible changes and modifications to the technical solutions of the present invention or modify the technical solutions of the present invention into equivalent embodiments of equivalent changes, by using the methods and technical content disclosed above without departing from the scope of the technical solutions of the present invention. Therefore, any simple modifications, equivalent changes and modifications made to the above embodiments according to the technical essence of the present invention without departing from the content of the technical solutions of the present invention shall fall within the protection scope of the technical solutions of the present invention.

What is claimed is:

1. A method of tracking control for a foot force and moment of a biped robot, comprising:
   distributing a desired force on a foot and a desired moment on the foot of the robot through a planned zero moment point (ZMP) of the robot, and
   calculating differences of the desired force on the foot and the desired moment on the foot from an actual force on the foot and an actual moment on the foot, respectively, wherein,
   the calculated differences are used as input of a force tracking controller,
   the force tracking controller outputs position adjustment quantities in three directions of an ankle joint,
   the position adjustment quantities are added to original ankle joint trajectory planning to obtain an adjusted ankle joint trajectory, and joint angles are obtained through inverse kinematics, so as to realize tracking of the foot force and moment of the robot and then realize ZMP tracking, and
   an expression of the force tracking controller is:

$$e=dsd(F, F_{old}, e_{old}, \dot{e}_{old}, T_{CONTROL})$$

where e is a sum of deformation quantities of two spring damping systems, F is an input external force, $F_{old}$ is an input force of a previous control period, $e_{old}$ is an output position adjustment quantity of the previous control period, $\dot{e}_{old}$ is an output position adjustment quantity derivative of the previous control period, and $T_{CONTROL}$ is a control period.

2. The method of the tracking control for the foot force and moment of the biped robot according to claim 1, wherein the three directions of the ankle joint comprise a vertical direction, a pitch direction, and a roll direction of the ankle joint.

3. The method of the tracking control for the foot force and moment of the biped robot according to claim 1, wherein the actual force on the foot and the actual moment on the foot are calculated through a six-dimensional force sensor in an ankle of the robot.

4. The method of the tracking control for the foot force and moment of the biped robot according to claim 1, wherein the desired force on the foot and the desired moment on the foot are calculated through a planned ZMP distribution method.

5. The method of the tracking control for the foot force and moment of the biped robot according to claim 4, wherein the specific process of calculation through the planned ZMP distribution method is:
   (1) calculating desired forces and moments on feet in a single-foot support period, comprising:
      calculating and distributing desired forces on feet in vertical directions of a left foot and a right foot according to a ratio of distances between the ZMP and ankle joints of two feet, and then respectively cross-multiplying vectors from the ZMP to positions of the ankle joints of the two feet by the two desired forces to respectively obtain desired moments on feet of the two feet; and
   (2) calculating desired forces and moments on feet in a double-foot support period, wherein a calculation method for the desired forces on feet is the same as that in the single-foot support period, and in calculating the desired moments on feet, first, a sum of desired moments of the two feet is calculated using the method for calculating desired moments on feet in the single-foot support period, and then desired moments on feet of the left foot and the right foot are calculated and distributed according to the ratio of the distances between the ZMP and the ankle joints of the two feet.

6. The method of the tracking control for the foot force and moment of the biped robot according to claim 1, wherein the two spring damping systems are connected in series to form a double-spring damping model, and each spring damping system is formed by a spring and a damper connected in parallel.

7. A method of tracking control for a foot force and moment of a biped robot, comprising:
   distributing a desired force on a foot and a desired moment on the foot of the robot through a planned zero moment point (ZMP) of the robot, and
   calculating differences of the desired force on the foot and the desired moment on the foot from an actual force on the foot and an actual moment on the foot, respectively, wherein,
   the calculated differences are used as input of a force tracking controller,
   the force tracking controller outputs position adjustment quantities in three directions of an ankle joint,
   the position adjustment quantities are added to original ankle joint trajectory planning to obtain an adjusted ankle joint trajectory, and joint angles are obtained through inverse kinematics, so as to realize tracking of the foot force and moment of the robot and then realize ZMP tracking, and
   the desired force on the foot and the desired moment on the foot are calculated through a planned ZMP distribution method comprising:
   (1) calculating desired forces and moments on feet in a single-foot support period, comprising:
      calculating and distributing desired forces on feet in vertical directions of a left foot and a right foot according to a ratio of distances between the ZMP and ankle joints of two feet, and then respectively cross-multiplying vectors from the ZMP to positions of the ankle joints of the two feet by the two desired forces to respectively obtain desired moments on feet of the two feet; and (2) calculating desired forces and moments on feet in a double-foot support period, wherein a calculation method for the desired forces on feet is the same as that in the single-foot support period, and in calculating the desired moments on feet, first, a sum of desired moments of the two feet is calculated using the method for calculating desired moments on feet in the single-foot support period, and then desired moments on feet of the left foot and the right foot are calculated and distributed according to the ratio of the distances between the ZMP and the ankle joints of the two feet.

8. The method of the tracking control for the foot force and moment of the biped robot according to claim 7, wherein the three directions of the ankle joint comprise a vertical direction, a pitch direction, and a roll direction of the ankle joint.

9. The method of the tracking control for the foot force and moment of the biped robot according to claim 7, wherein the actual force on the foot and the actual moment on the foot are calculated through a six-dimensional force sensor in an ankle of the robot.

10. The method of the tracking control for the foot force and moment of the biped robot according to claim 7, wherein an expression of the force tracking controller is: $e=\text{dsd}(F, F_{old}, e_{old}, \dot{e}_{old}, T_{CONTROL})$, where e is a sum of deformation quantities of two spring damping systems, F is an input external force, $F_{old}$ is an input force of a previous control period, $e_{old}$ is an output position adjustment quantity of the previous control period, $\dot{e}_{old}$ is an output position adjustment quantity derivative of the previous control period, and $T_{CONTROL}$ is a control period.

11. The method of the tracking control for the foot force and moment of the biped robot according to claim 10, wherein the two spring damping systems are connected in series to form a double-spring damping model, and each spring damping system is formed by a spring and a damper connected in parallel.

* * * * *